UNITED STATES PATENT OFFICE.

CARL SCHEIBLER, OF BERLIN, GERMANY, ASSIGNOR TO HUGO KUNHEIM, OF SAME PLACE.

PROCESS OF SEPARATING GYPSUM FROM THE SOLUTIONS OF STARCH-SUGAR PRODUCED BY TREATING THE LATTER WITH SULPHURIC ACID.

SPECIFICATION forming part of Letters Patent No. 243,310, dated June 21, 1881.

Application filed January 17, 1881.

*To all whom it may concern:*

Be it known that I, CARL SCHEIBLER, a subject of the King of Prussia, residing at the city of Berlin, in the Empire of Germany, have invented certain new and useful Improvements in the Process of Separating Gypsum from the Solutions of Starch-Sugar Produced by Treating the Latter with Sulphuric Acid; and I do hereby declare the following to be a full, clear, and exact description of the invention, such as will enable others skilled in the art to which it appertains to make and use the same.

The conversion of starch-flour of whatever origin into starch-sugar (grape-sugar) and dextrine is now effected by means of sulphuric acid, as the speediest and most economical inorganic acid known for this purpose. After the sulphuric acid, which in this process does not undergo any changes, has performed its functions it is precipitated from the saccharine solution in the form of gypsum by neutralizing the acid with lime, and the gypsum is then filtered off. However, the filtered saccharine solution contains yet a quantity of gypsum equivalent to that which corresponds with the degree of solubility of the latter in said solution. This presence of gypsum is the source of various inconveniences which present themselves in the further treatment of the saccharine solution, of which the following are some of the most serious: During the process of evaporation the gypsum is largely precipitated and forms incrustations upon the walls of the evaporating-pans that seriously interfere with this process and are a source of constant trouble, while gypsum that is not precipitated during evaporation seriously affects both the taste and smell of the sirup. When the saccharine solution is filtered through bone-black the latter will absorb most of the gypsum which is thus transferred from the saccharine solution to the more valuable filtering medium, which, as is well known, has to be revivified or regenerated for further use, which is usually done by washing and heating. Yet this washing of the bone-black, however often it may be repeated, fails to remove all the gypsum, and that which remains is converted into sulphuret of calcium when the bone-black is heated, while the oxygen of the gypsum passes off with the carbon of the bone-black either in the form of carbonic-acid or carbonic-oxide gas, ($SCaO_4 + 2C = CaS + 2CO_2$ or $CaSO_4 + 4C = CaS + 4CO$.) Leaving aside the fact that the bone-black becomes poorer in carbon at each regeneration, and consequently poorer in the discoloring or clarifying properties, which are chiefly attributable to the carbon, it is after each heating intimately mixed with sulphuret of calcium, which, when the bone-black is again employed for filtering saccharine solution, is in part dissolved or the sulphuret of calcium develops sulphureted hydrogen, that imparts a disagreeable taste and smell to or produces turbidity in the saccharine solution, (through the secreted and finely-divided sulphur and sulphuret of iron.)

The above in part recited inconveniences and defects could not arise if the gypsum is eliminated from the saccharine solutions by means of a convenient agent; and the object of my invention is to provide means to effect this separation in a convenient and thorough manner.

In carrying out my invention I employ, preferably, barium-oxalate, ($C_2BaO_4 + 1H_2O$,) as obtained in the form of a fine insoluble precipitate from soluble hydrochlorate of baryta and a soluble oxalate. The barium-oxalate forms with the soluble gypsum two insoluble combinations—namely, sulphate of barium and oxalate of lime, to wit: ($CaSO_4 + C_2BaO_4 = BaSO_4 + C_2CaO_4$,) producing, therefore, two new and perfectly insoluble salts. Other insoluble barium salts, obtained from soluble oxalates as described, may be employed with equally good results. The barium-oxalate I employ preferably in a wet state, and in excess. A given excess of barium-oxalate is necessary, because a portion of it escapes the reaction, inasmuch as the particles of the barium-oxalate are enveloped by the resulting sulphate of barium and oxalate of lime. For a given method of operation this excess may be ascertained once for all by trial upon a small scale. The practical application of this process is therefore very simple.

The grape-sugar solution obtained by means of sulphuric acid in the usual well-known manner—after neutralization by means of lime, and the removal of the resulting gypsum either through filtration or by allowing the gypsum to settle—is decomposed by addition thereto of an excess of barium-oxalate, in a viscous or semi-fluid condition preferably, and is then boiled until properly concentrated, when it will be found entirely free from gypsum, which is left in the resulting slime, and the concentrated saccharine solution may then be subjected to the usual further treatment. From this resultant slime, composed of oxalate of lime, sulphate of barium, and the excess of barium-oxalate, the acid may be recovered in the usual manner by treatment with sulphuric acid, and a precipitate containing barium, sulphate, and gypsum is obtained, which may be utilized in the manufacture of paper, or otherwise.

I do not desire to limit myself to the exclusive use of barium-oxalate, as any other insoluble barium salt obtained from soluble oxalates will form with lime an insoluble or practically insoluble combination—as, for instance, barium phosphate; nor do I desire to limit myself to the treatment of saccharine solutions containing gypsum, as any other neutral solution may be treated in a like manner for like purposes.

Having now described my invention, what I claim is—

1. The process of removing gypsum from neutral solutions, which consists in treating the solution with an excess of barium-oxalate or other insoluble barium-salt obtained from a soluble oxalate, and which forms an insoluble combination with lime, substantially as set forth.

2. The process of removing gypsum from saccharine solutions, which consists in removing the bulk of the gypsum by filtration or decantation, and then treating the solution with an excess of barium-oxalate or other insoluble barium-salt obtained from a soluble oxalate, and which forms an insoluble combination with lime, and removing the remaining gypsum with the scum during concentration of the solution, substantially as described.

3. The process of removing sulphuric acid from saccharine solutions, which consists in first neutralizing the acid by means of lime, then removing the bulk of the resulting gypsum by filtration or decantation, and the remaining gypsum by treating the solution with an excess of barium-oxalate or other insoluble barium-salt obtained from a soluble oxalate, and which forms an insoluble combination with lime, substantially as set forth.

In testimony whereof I affix my signature in presence of two witnesses.

CARL SCHEIBLER.

Witnesses:
HUGO KUNHEIM,
GEORGE LOUBIER.